United States Patent
Bloomfield et al.

(10) Patent No.: US 11,193,030 B2
(45) Date of Patent: Dec. 7, 2021

(54) COC POLYMER COMPOUNDS FOR 3D PRINTING

(71) Applicants: PolyOne Corporation, Avon Lake, OH (US); Spyder3D LLC, Brea, CA (US)

(72) Inventors: Joseph Bloomfield, Diamond Bar, CA (US); Roger W. Avakian, Solon, OH (US); Yannan Duan, Avon, OH (US)

(73) Assignees: Avient Corporation, Avon Lake, OH (US); Spyder3D LLC, Brea, CA (US)

( * ) Notice: Subject to any disclaimer, the term of this patent is extended or adjusted under 35 U.S.C. 154(b) by 0 days.

(21) Appl. No.: 16/312,936

(22) PCT Filed: Jun. 22, 2017

(86) PCT No.: PCT/US2017/038685
§ 371 (c)(1),
(2) Date: Dec. 21, 2018

(87) PCT Pub. No.: WO2017/223276
PCT Pub. Date: Dec. 28, 2017

(65) Prior Publication Data
US 2019/0322884 A1    Oct. 24, 2019

Related U.S. Application Data

(60) Provisional application No. 62/354,328, filed on Jun. 24, 2016.

(51) Int. Cl.
| | | |
|---|---|---|
| *C09D 11/108* | (2014.01) | |
| *C08F 210/02* | (2006.01) | |
| *C08F 232/08* | (2006.01) | |
| *B33Y 70/00* | (2020.01) | |
| *B29C 64/118* | (2017.01) | |
| *B29K 9/06* | (2006.01) | |
| *B29K 23/00* | (2006.01) | |
| *B29K 509/02* | (2006.01) | |

(52) U.S. Cl.
CPC ............ *C09D 11/108* (2013.01); *B33Y 70/00* (2014.12); *C08F 210/02* (2013.01); *C08F 232/08* (2013.01); *B29C 64/118* (2017.08); *B29K 2009/06* (2013.01); *B29K 2023/0625* (2013.01); *B29K 2023/38* (2013.01); *B29K 2509/02* (2013.01)

(58) Field of Classification Search
CPC .... C08F 232/08; C09D 145/00; B29C 64/118
See application file for complete search history.

(56) References Cited

U.S. PATENT DOCUMENTS

| | | |
|---|---|---|
| 5,221,534 A | 6/1993 | DesLauriers et al. |
| 5,331,057 A * | 7/1994 | Brekner ............... C08F 267/08 525/210 |
| 5,723,545 A | 3/1998 | Harrington et al. |
| 5,763,532 A | 6/1998 | Harrington et al. |
| 5,837,787 A | 11/1998 | Harrington |
| 6,121,383 A | 9/2000 | Abdou-Sabet et al. |
| 8,148,472 B1 | 4/2012 | Baugh et al. |
| 8,344,070 B2 | 1/2013 | Squire et al. |
| 8,519,056 B2 | 8/2013 | Baugh et al. |
| 9,227,366 B2 | 1/2016 | Giller |
| 9,785,064 B2 | 10/2017 | Orrock et al. |
| 9,862,146 B2 | 1/2018 | Driessen et al. |
| 2002/0017743 A1 | 2/2002 | Priedeman, Jr. |
| 2003/0004600 A1 | 1/2003 | Priedeman, Jr. |
| 2004/0222561 A1 | 11/2004 | Hopkins |
| 2005/0014898 A1 | 1/2005 | Kanai |
| 2005/0040564 A1 | 2/2005 | Oliver et al. |
| 2010/0096072 A1 | 4/2010 | Hopkins et al. |
| 2011/0184082 A1 | 7/2011 | Wright et al. |
| 2011/0256373 A1 * | 10/2011 | Tatarka ............... C08L 23/0823 428/218 |
| 2014/0353197 A1 | 12/2014 | Hu et al. |
| 2018/0194662 A1 * | 7/2018 | Kim ..................... C03C 3/04 |
| 2019/0001569 A1 | 1/2019 | Avakian |

FOREIGN PATENT DOCUMENTS

| | | |
|---|---|---|
| EP | 0726291 | 8/1996 |
| EP | 2568012 | 3/2013 |
| JP | 2000-169558 | 6/2000 |
| WO | WO0069930 | 11/2000 |

OTHER PUBLICATIONS

O'Neal, The Fluidic Factory is the First Commercial 3D Printer for Fabricating Microfluidic Chips & More, 6 pages, Mar. 16, 2016 as evidenced by Tatarka et al. (US 2011/0256373), cited above or (anonymous) Topas Cyclic Olefin Copolymer (COC), Mar. 2006.*
(Anonymous) Topas Cyclic Olefin Copolymer (COC), Mar. 2006.*
Dorigato et al. "Linear Low Density Polyethylene/Cycloolefin Coplymer" eXPRESS Polymer Letters vol. 5, Issue 1, pp. 23-37 (2011).
Khanarian, "Rubber Toughened and Optically Transparent Blends of Cyclic Olefin Copolymers" Polymer Engineering and science vol. 40 No. 12 pp. 2590-2601 (2000).
Khonakdar et al., "Miscibility Analysis, Viscoelastic Properties and Morphology of Cyclic Olefin Copolymer/Polyolefin Elastomer (COC/POE) Blends" Composites Part B 2015 vol. 69 pp. 111-119 (2014).
Zeon, "Zeonor Cyclic Olefin Polymer" Brochure (2014).
Sticker et al., "Rubber Toughened Cycloolefin Copolymers" Die Angewandte Makromolekulare Chemie vol. 256 Issue 1 pp. 101-104 (1998).
Topas, "Cyclic Olefin Copolymer" Brochure (2011).
Tartarka, "Modified Cyclic Olefin Copolymers as New Cost and Sustainability Tool for Multilayer Packaging Films" SPA Presentation by Topas Advanced Polymers (2011).
Topas, "Technical Data Sheet for 6017S-04" (2014).

* cited by examiner

*Primary Examiner* — Jeffrey C Mullis
(74) *Attorney, Agent, or Firm* — John H. Hornickel; Emily E. Vlasek

(57) ABSTRACT

Cyclic olefin copolymer (COC) is useful as a build material for 3D printing, especially desktop 3D printing.

7 Claims, No Drawings

COC POLYMER COMPOUNDS FOR 3D PRINTING

CLAIM OF PRIORITY

This application claims priority from U.S. Provisional Patent Application Ser. No. 62/354,328 filed on Jun. 24, 2016, which is incorporated by reference.

FIELD OF THE INVENTION

This invention concerns certain polymeric materials useful to form a polymer article made by 3D Printing, alternatively known as Fused Deposition Modeling (FDM) or Additive Manufacturing (AM).

BACKGROUND OF THE INVENTION 3D printing (also known by the other phrases identified above) is being hailed in the polymer industry as a new means of forming shaped polymeric articles, literally from the ground up. Like soldering, a space is filled by a material coming from a filamentary form and being heated for delivery precisely to the x-y-z axis coordinates of that space.

A lattice or scaffold of supporting material is also often delivered to adjoining spaces in the same precise manner to fortify the polymeric material of the shaped, printed article until that polymeric material sufficiently cools to provide a final rigid structure in the desired shape, which can be separated from the supporting material.

However, 3D printing of polymer compounds into desired three dimensional shapes preferably uses a thermoplastic material ("build material") which can be self-supporting during deposition of each layer of build material on an x-y plane, building in the z direction.

3D printing has entered the "desktop" era with relatively inexpensive printing machines useful for the individual consumer or the small group and now having access to libraries of open source instructions and computer files to make via 3D printing nearly any plastic article imaginable.

SUMMARY OF THE INVENTION

What the art needs is a polymer material which is sufficiently ductile that it can be formed into a filament having a diameter ranging from about 1.6 to about 2.9 mm and preferably from about 1.74 to about 2.86 mm and sufficiently flexible that such filament can be wound about a core having a diameter of from about 15 cm to about 25 cm and preferably from about 19 cm to about 22 cm.

Stated another way, the polymer material can be sufficiently ductile and flexible that filament of the diameters identified above can form a loop of about 64 cm (25.13 inches) in circumference.

Stated another way, the polymer material can be sufficiently ductile and flexible that filament of the diameters identified above in a length of about 38 cm (15 inches) can be bent upon itself, such that the opposing ends of that length of filament can touch each other.

Above all else, the polymer material should be safe in the possession and use of consumers, school children, scout troops, or others being introduced to 3D printing via desktop-sized 3D printers.

The evolution of 3D printing is following the model of personal computing and desktop publishing, in which the versatility of the software programs could result in a manuscript, spreadsheet, or presentation which then needed to be printed individually, usually by thermal-inkjet desktop printers.

With 3D printing, desktop-size publishing of three-dimensional objects requires a different dynamic than the cyan, magenta, yellow, and black (CMYK) cartridges used in those inkjet printers. 3D printing involves bringing polymer material to high temperature melt conditions, normally an activity in a well-regulated and safety-equipped manufacturing facility to address any volatile chemicals being emitted during molding, extruding, thermoforming, calendering, or any other reshaping process for the polymer material which is needed to reach final shape for end use purposes.

Polymer materials used for 3D printing on desktop-sized printers must be versatile to be useful on the many types of 3D printers and safe for use by individuals who are not familiar with polymer melt reshaping processing and the safety conditions needed to protect those users when literally melting polymer.

Addressing these constraints and considerations, it has been found that cyclic olefin copolymer (COC) can meet the requirements identified above to serve as the polymer for 3D desktop printing of polymer articles.

COC has sufficient melt strength at the processing temperature range for 3D printing.

Additionally, COC is inherently clear and hence can be colored using conventional colorants for polymers, to help distinguish the one color of 3D filament from another, allowing for color to be yet another variable in the creativity of desktop 3D printing.

COC is sold in various molecular weights and hence can have a robust product range to provide melt viscosities to be suitable for use as polymeric build materials in 3D printing.

These COC polymer grades are also thermally stable and do not depolymerize readily.

Thus, one disclosure of the invention is a build material during 3D printing comprising cyclic olefin copolymer having a heat deflection temperature HDT/B ((0.45 MPa) ISO Parts 1 and 2) of less than 125° C. or less.

EMBODIMENTS OF THE INVENTION

3D Printable Build Material

COC

Cyclic olefin copolymer (COC) is an amorphous, transparent copolymer based on polymerization of a combination of cyclic olefins and linear olefins. COC has high transparency, low water absorption, variable heat deflection temperature up to 170° C. and good resistance to acids and alkalis.

Cyclic olefin copolymer (COC) can refer to copolymers of cyclic olefin monomers, such as norbornene or tetracyclododecene, with ethene or other alkenes. The most common COC is ethylene-norbornene copolymer which has a CAS No. of 26007-43-2 and the following structure:

wherein X ranges from about 40 wt. % to about 20 wt. % and preferably from about 25 wt. % to about 18 wt. % and wherein Y ranges from about 60 wt. % to about 80 wt. % and preferably from about 75 wt. % to about 82 wt. %.

Any COC grade is a candidate for use in the invention as a build material because it is commercially available arising from its use as a polymer resin for high temperature thermoplastic compounds.

COC should have a weight average molecular weight (Mw) ranging from about 40,000 to about 130,000 and preferably from about 93,000 to about 125,000. COC should have a heat deflection temperature ranging from about 75° C. to about 125° C. and preferably from about 75° C. to about 100° C. at 0.45 MPa (66 psi load).

Commercially available COC is sold by TOPAS Advanced Polymers using the TOPAS® brand. Of the commercial grades available, TOPAS® 6017S-04 COC, an injection molding grade, is presently preferred because it has the highest heat deflection temperature within the TOPAS product family. Its Vicat softening temperature B50 (50° C./h 50N) is 178° C. as tested using the procedure of ISO 306. Also, its degree of light transmission is 91% as tested using the procedure of ISO 13468-2. Its tensile modulus (1 mm/min) is 3000 MPa as tested using the procedure of ISO 527-2/1A.

Another desirable attribute for the COC is a polymer with low amounts of oligomers which could volatilize for a user of a 3D desktop printer.

Impact Modifiers

When there is a desire for enhanced impact toughness and ductility, a second polymer can be blended with COC via melt-mixing. Any well-known polymer known for providing impact strength to a polymer such as COC, which otherwise lacks sufficient desired strength for intricate self-supporting structures, is a candidate for use in this invention.

Styrenic block copolymers (SBCs) are very well known as excellent modifiers to provide elastomeric properties to a non-elastomeric polymer resin. SBCs are block copolymers with at least one hard block of styrene monomer and one soft block of olefin monomer. Of the SBCs commercially available, styrene-butadiene-styrene (SBS), styrene-ethylene-butylene-styrene (SEBS), and styrene-ethylene-propylene-styrene (SEPS) are the leading SBCs used. Kraton Polymers LLC sells many different grades and combinations of these SBCs.

Olefin block copolymers (OBCs) are also very well known as excellent modifiers to provide elastomeric properties to a non-elastomeric polymer resin. OBCs are block copolymers with at least one hard block of polyethylene and one soft block of α-olefin ethylene copolymer. Dow Chemical sells many different grades and combinations of these OBCs.

Other well-known impact modifiers are capable of identification for use in this invention by those persons having ordinary skill in the art without undue experimentation to have excellent impact modification properties to provide elastomeric properties to a non-elastomeric polymer resin.

Optional Additives to Support Material

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides; antibacterials; fungicides; mildewcides; anti-fogging agents; anti-static agents; bonding, blowing agents; foaming agents; dispersants; fillers; extenders; fire retardants; flame retardants; flow modifiers; smoke suppressants; initiators; lubricants; micas; pigments, colorants and dyes, including, but not limited to fluorescent and non-fluorescent dyes and pigments; plasticizers; processing aids; release agents; silanes, titanates and zirconates; slip agents; anti-blocking agents; stabilizers; stearates; ultraviolet light absorbers; viscosity regulators; waxes; optical brighteners; rheology modifiers; thermal and UV stabilizers; radio-opaque tracers, conductive additives (both thermal and electrical); inductive hearing additives; non-silicone releases and combinations of them.

Table 1 shows acceptable, desirable, and preferable ranges of ingredients useful for polymeric articles containing thermally conductive, electrically insulative additives, all expressed in weight percent (wt. %) of the entire compound. The compound can comprise, consist essentially of, or consist of these ingredients. Any number between the ends of the ranges is also contemplated as an end of a range, such that all possible combinations are contemplated within the possibilities of Table 1 as candidate compounds for use in this invention.

TABLE 1

|  | Acceptable | Desirable | Preferable |
|---|---|---|---|
| COC | 75-100 | 85-99 | 90-97 |
| Optional SBC or OBC Impact Modifier | 0-25 | 1-15 | 3-10 |
| Optional Other Additives | 0-7 | 0-5 | 0-5 |

Processing

To the extent that COC copolymer resin is to be used as a build material for 3D printing without use of optional additives, processing is not needed. But if optional additives are used, then processing of the polymer resin into polymer compound is needed, either in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 200 to about 400 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

For use as a build material, the polymer resin or the polymer compound emerges from the extruder as a strand of a length ranging from about 0.137 m (0.25 ft.) to about 1.82 m (6 ft.) and preferably from about 0.60 to about 0.91 m (about 2 ft. to about 3 ft). Longer strands can be coiled on to a spool for easier dispensing at the 3D printer.

Often, the strand is pelletized and then delivered to a specialist to make filament from the pellets. Filaments for delivery of polymer to the very precise x-y-z axis location is very important to the building of the 3D polymer article both aesthetically and structurally. Filamentizing of polymer pellets or strands is often undertaken by manufacturers of the various 3D printing machines because of the necessity for exacting tolerances when the filaments are spooled and then used in the 3D printer.

Usefulness of the Invention 3D printing is already transforming manufacturing operations using polymers. 3D printing moves beyond the traditional extrusion, molding, sheeting, calendering, and thermoforming techniques, because of the ability of 3D printing in all three dimensions to form, in one operation, any final-shape polymer article.

3D printing is finding markets of usage ranging from desktop machines for the individual to prototyping machines for the product developer to the production machines to form three dimensional objects which are difficult to produce via traditional molding, casting, or other shaping techniques. Unlike other techniques which provide a preliminary shape, followed by subtraction of material to reach the final shape, 3D printing is truly manufacturing by a one step additive process. Optional surface finishing can follow the additive manufacturing event.

The specific COC formulations disclosed herein can be engineered for use in the 3D printing technique of plastic article shaping. Simple or complex shapes can be printed digitally relying upon the x-y-z axis coordinates of space and computer software to drive the printer using filaments made from polymers disclosed herein to melt, deposit, and cool layer-by-layer in the z axis above the initial x-y plane to build any conceivable three-dimensional COC polymeric object.

Combining the emerging technique of 3D printing with the performance properties of COC-based polymer materials is a tremendous combination of manufacturing processing and end-use performance not previously achieved. 3D printed polymer articles can be of any form or shape conceivable, even a Möbius strip.

3D printed polymer articles in a desktop manufacturing scale can be used to make individual objects as end use articles or prototypes for assessment of performance before large scale manufacturing commences.

COC copolymer itself or the COC copolymer compounds disclosed herein are particularly suitable for their ease of use in a desktop manufacturing scale, especially for home users, schools, clubs, scout-troops, and others not yet involved in full scale manufacturing but needing to learn about this new method of manufacture using polymers to form them into their final three-dimensional shapes. Introduction to 3D printing often begins with familiar shapes such as hobby and collectable objects, toys, souvenirs, etc.

COC copolymer itself or COC copolymer compounds formulated to be more tough and impact resistant can be made into any extruded, molded, calendered, thermoformed, or 3D-printed article. Candidate end uses for such thermoplastic articles are listed in summary fashion below.

Appliance Parts: Refrigerators, freezers, washers, dryers, toasters, blenders, vacuum cleaners, coffee makers, and mixers;

Building and Construction Structural Items: Fences, decks and rails, floors, floor covering, pipes and fittings, siding, trim, windows, doors, molding, and wall coverings;

Consumer Goods: Hobby and collectable objects, toys, souvenirs, power hand tools, rakes, shovels, lawn mowers, shoes, boots, golf clubs, fishing poles, and watercraft;

Electrical/Electronic Devices: Printers, computers, business equipment, LCD projectors, mobile phones and other handheld electronic devices, connectors, chip trays, circuit breakers, and plugs;

Healthcare: Wheelchairs, beds, testing equipment, analyzers, labware, ostomy, IV sets, wound care, drug delivery, inhalers, and packaging;

Industrial Products: Containers, bottles, drums, material handling, gears, bearings, gaskets and seals, valves, wind turbines, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles, under hood electrical, and engine covers; and Wire and Cable: Cars and trucks, airplanes, aerospace, construction, military, telecommunication, utility power, alternative energy, and electronics.

Composites of the cyclo-olefin copolymers of this invention with other ingredients added for functional purposes can be used in a number of high performance articles, such as lightweight polymer composites (e.g., airframe and engine components); military and commercial aircraft; missiles, radomes, and rockets, etc.; high temperature laminates; electrical transformers; bushings/bearings for engines; oil drilling equipment; oil drilling risers; automotive chassis bearings; and films for use in electronics, fuel cells and batteries.

The new production of composites begins with a solventless melt mixing process described above, which can combine the COC copolymer with any of the additives described above.

For reinforcing purposes, it is possible to include carbon, glass, or synthetic fibers as additives in the melt-mixing extrusion to form the filament for 3D printing.

Examples further explain the invention.

EXAMPLES

Comparative Examples A-S and Examples 1 & 2

Formulations and Test Results

Table 2 shows the list of ingredients. Table 3 and Table 4 show the extrusion conditions. Tables 5 and 6 show the molding conditions. Tables 7 shows the recipes, which extrusion conditions and which molding conditions were used, and the 3D Printing test results. Only two Examples proved acceptable for 3D Printing among 21 different formulations by conclusions by an expert in 3D printing based on qualitative observations of performance compared to commercially available polymeric filaments used by that expert.

TABLE 2

| Brand Name | Ingredient and Purpose | Commercial Source |
|---|---|---|
| Novapol ® GF-0218 | LLDPE (linear low density polyethylene) | NOVA Chemicals |
| Topas ® 6017S | COC (cyclic olefin copolymer), a clear grade with a heat deflection temperature HDT/B of 170° C. used for parts requiring resistance to short-term, high-temperature exposure. | TOPAS Advanced Polymers, Inc. |
| Topas ® 6013S | COC (cyclic olefin copolymer) a clear grade with a heat deflection temperature HDT/B of 130° C., a value which cannot be attained by many amorphous polymers and having a combination of high purity, chemical resistance, high transparency and high HDT/B, useful for products such as labware, which can be gamma- and steam-sterilized. | TOPAS Advanced Polymers, Inc. |
| Kraton ® G1651 | Styrene-ethylene/butylene-styrene (SEBS) thermoplastic elastomer | Kraton Performance Polymers, Inc. |
| TIONA ® RCL4 | $TiO_2$ | Cristal Global |
| Zeonor ® 1060R | Cyclo-olefin polymers (COP) | Zeon Corporation |
| Zeonor ® 1020R | Cyclo-olefin polymers (COP) | Zeon Corporation |
| Irganox ® B225 | Processing and long-term thermal stabilizer | BASF |
| OCV ™ milled fiber 737BC 1/64 | Milled glass fibers | Owens Corning |
| Elvaloy ® PTW | Ethylene terpolymer | DuPont ™ |
| Topas ® 8007S | COC (cyclic olefin copolymer) a clear grade with a heat deflection temperature HDT/B of 75° C., being especially suited for packaging of moisture-sensitive products because of its low water absorption and very good barrier properties and having a lower elastic modulus and higher elongation than other Topas COC grades. | TOPAS Advanced Polymers, Inc. |
| Topas ® 5013L | COC (cyclic olefin copolymer) a clear grade with a heat deflection temperature HDT/B of 130° C. and being characterized by high flowability and excellent optical properties, for applications such as optical parts, e. g., lenses, and optical storage media, where low birefringence and high molding accuracy (pit replication) are essential, as well as for medical and diagnostic applications. | TOPAS Advanced Polymers, Inc. |
| TOPAS ® ELASTOMER E-140 | COC (cyclic olefin copolymer) elastomer with good transparency, excellent barrier properties and high purity and being highly flexible and having an 89 Shore A hardness, suitable for numerous flexible applications such as medical devices, medical tubing, IV bags, and other healthcare applications | TOPAS Advanced Polymers, Inc. |

TABLE 3

| Extruder Conditions | |
|---|---|
| Extruder Type | Prism 16 mm TSE (40 L/D) screw extruder |
| Order of Addition | All ingredients mixed together and fed into the extruder hopper. |
| Zone 1 | 280° C. |
| Zone 2 | 280° C. |
| Zone 3 | 280° C. |
| Zone 4 | 280° C. |
| Zone 5 | 280° C. |
| Zone 6 | 280° C. |
| Zone 7 | 280° C. |
| Zone 8 | 280° C. |
| Zone 9 | 280° C. |
| Die | 280° C. |
| RPM | 300 |

TABLE 4

| Extruder Conditions | |
|---|---|
| Extruder Type | Prism 16 mm TSE (40 L/D) screw extruder |
| Order of Addition | All ingredients mixed together and fed into the extruder hopper. |
| Zone 1 | 230° C. |
| Zone 2 | 230° C. |
| Zone 3 | 230° C. |
| Zone 4 | 230° C. |
| Zone 5 | 230° C. |
| Zone 6 | 230° C. |
| Zone 7 | 230° C. |
| Zone 8 | 230° C. |
| Zone 9 | 230° C. |
| Die | 230° C. |
| RPM | 300 |

TABLE 5

| Molding Conditions Nissei 88 molding machine | |
|---|---|
| Drying Conditions before Molding: | |
| Temperature (° C.) | 80° C. |
| Time (h) | 14 hrs |
| Temperatures: | |
| Nozzle (° C.) | 260 |
| Zone 1 (° C.) | 254 |
| Zone 2 (° C.) | 249 |
| Zone 3 (° C.) | 249 |
| Mold (° C.) | 66 |
| Oil Temp (° C.) | 30 |
| Speeds: | |
| Screw RPM (%) | 100 |
| % Shot - Inj Vel Stg 1 | 70 |
| % Shot - Inj Vel Stg 2 | 20 |
| % Shot - Inj Vel Stg 3 | 20 |
| % Shot - Inj Vel Stg 4 | 20 |
| % Shot - Inj Vel Stg 5 | 15 |
| Timers: | |
| Injection Hold (sec) | 4 |
| Cooling Time (sec) | 15 |
| Operation Settings: | |
| Shot Size (mm) | 38-41 |
| Cushion (mm) | 0.8-3.3 |

TABLE 6

| Molding Conditions Nissei 88 molding machine | |
|---|---|
| Drying Conditions before Molding: | |
| Temperature (° C.) | 80° C. |
| Time (h) | 14 hrs |

TABLE 6-continued

Molding Conditions
Nissei 88 molding machine

Temperatures:

| | |
|---|---|
| Nozzle (° C.) | 232 |
| Zone 1 (° C.) | 226 |
| Zone 2 (° C.) | 221 |
| Zone 3 (° C.) | 221 |
| Mold (° C.) | 54 |
| Oil Temp (° C.) | 30 |

Speeds:

| | |
|---|---|
| Screw RPM (%) | 100 |
| % Shot - Inj Vel Stg 1 | 70 |
| % Shot - Inj Vel Stg 2 | 20 |
| % Shot - Inj Vel Stg 3 | 20 |
| % Shot - Inj Vel Stg 4 | 20 |
| % Shot - Inj Vel Stg 5 | 15 |

Timers:

| | |
|---|---|
| Injection Hold (sec) | 6 |
| Cooling Time (sec) | 20 |

Operation Settings:

| | |
|---|---|
| Shot Size (mm) | 32 |
| Cushion (mm) | 5 |

TABLE 7

| | Example A | B | C | D |
|---|---|---|---|---|
| Kraton G1651 | 23.000 | 23.000 | 23.000 | 23.000 |
| Topas 6013s | 53.500 | 50.000 | 46.400 | 43.000 |
| Topas 6017s | 21.500 | 20.000 | 18.600 | 17.000 |
| TiO₂ RCL 4 | 2.000 | 2.000 | 2.000 | 2.000 |
| Novapol GF-0218 | | 5.000 | 10.000 | |
| Zeonor 1060R | | | | 15.000 |
| Total (%) | 100.0 | 100.0 | 100.0 | 100.0 |
| Extrusion Conditions | Table 3 | Table 3 | Table 3 | Table 3 |
| Molding Conditions | Table 5 | Table 5 | Table 5 | Table 5 |
| 3D Printing Performance | No Good | No Good | No Good | No Good |

| | Example E | F | G | H | I | J |
|---|---|---|---|---|---|---|
| Kraton G1651 | 23.000 | 23.000 | 10.000 | 23.000 | 23.000 | 15.000 |
| Topas 6013s | | | | 33.900 | 48.900 | 56.900 |
| Topas 6017s | | | 15.000 | | | |
| TiO₂ RCL 4 | 2.000 | 2.000 | 2.000 | 2.000 | 2.000 | 2.000 |
| Zeonor 1020R | | | | | | |
| Zeonor 1060R | 49.000 | 58.900 | 61.900 | | | |
| Novapol GF-0218 | 26.000 | 16.000 | 26.000 | 26.000 | 26.000 | 26.000 |
| IRGANOX B225 | 0.00 | 0.100 | 0.100 | 0.100 | 0.100 | 0.100 |
| Total (%) | 100.0 | 100.0 | 100.0 | 100.0 | 100.0 | |
| Extrusion Conditions | Table 4 | Table 4 | Table 4 | Table 3 | Table 3 | Table 3 |
| Molding Conditions | Table 6 | Table 6 | Table 6 | Table 5 | Table 5 | Table 5 |
| 3D Printing Performance | No Good | No Good | No Good | No Good | No Good | No Good |

| | Example K | L | M | N | O | P |
|---|---|---|---|---|---|---|
| Kraton G1651 | 10.000 | 10.000 | 10.000 | 15.000 | 15.000 | 15.000 |
| Topas 6013s | | | | 46.900 | 53.900 | 43.900 |
| TiO₂ RCL 4 | 2.000 | 2.000 | 2.000 | 2.000 | 2.000 | 2.000 |
| Zeonor 1060R | 61.900 | 68.900 | 58.900 | | | |
| LLDPE Novapol GF-0218 | 16.000 | 16.000 | 16.000 | 26.000 | 26.000 | 26.000 |
| ANOX BB 011/IRGANOX B225 | 0.100 | 0.100 | 0.100 | 0.100 | 0.100 | 0.100 |
| OCV ™ milled fiber 737BC 1/64 | 10.000 | | 10.000 | 10.000 | | 10.000 |
| Elvaloy PTW | | 3.000 | 3.000 | | 3.000 | 3.000 |
| Total (%) | 100.0 | 100.0 | 100.0 | 100.0 | 100.0 | 100.0 |
| Extrusion Conditions | Table 4 | Table 4 | Table 4 | Table 3 | Table 3 | Table 3 |
| Molding Conditions | Table 6 | Table 6 | Table 6 | Table 5 | Table 5 | Table 5 |
| 3D Printing Performance | No Good | No Good | No Good | No Good | No Good | No Good |

| | Example 1 | Q | R | S | 2 |
|---|---|---|---|---|---|
| Topas 8007 | 93.000 | 90.000 | | | 95.00 |
| Topas 5013 | | | 90.000 | 85.000 | |
| Kraton G1651 | 5.000 | | | | 5.00 |
| TiO₂ RCL 4 | 2.000 | | | | |
| Topas E-140 | | 10.000 | 10.000 | 15.000 | |
| Total (%) | 100.0 | 100.0 | 100.0 | 100.0 | 100.00 |
| Extrusion Conditions | Table 3 | Table 3 | Table 3 | Table 3 | Table 3 |
| Molding Conditions | Table 5 | Table 5 | Table 5 | Table 5 | Table 5 |
| 3D Printing Performance | Good | No Good | No Good | No Good | Good |

Examples 1 and 2 and Comparative Example Q differed from all of Comparative Examples A-P and R and S because Examples 1 and 2 and Comparative Example Q used the Topas COC grade having the lowest heat deflection temperature HDT/B commercially available.

Without being limited to a particular theory, it is possible that such grade is superior in performance as a build material for 3D printing filaments to other Topas grades because Topas 8007 grade is distinguished from other Topas grades by having a heat deflection temperature HDT/B of 75° C. ((0.45 MPa) ISO 75, Parts 1 and 2). The next current commercial grades, both Topas 5013 and Topas 6013, have a heat deflection temperature HDT/B of 130° C.

Though not presently commercially available, without undue experimentation, a person having ordinary skill in the art could replace Topas 8007 grade in Example 1 with a grade having a heat deflection temperature HDT/B of less than 125° C., or 120° C., or 115° C., or 110° C., or 105° C., or 100° C., or 95° C., or 90° C., or 85° C., or 80° C., or any other temperature between 76° C. and 125° C., depending upon which new Topas grades are brought to commercial availability. Experimentation could then identify acceptable performance properties based on the results identified in these Examples and Comparative Examples.

The Comparative Examples using grades of Topas COC other than grade 8007 did not differ significantly in properties other than HDT/B. As the commercial literature from Topas about its COC grades indicate, Grade 8007 does not have (a) the lowest or highest volume flow index as measured according to ISO 1133, either at 260° C. or 115° C.; (b) density; or (c) water absorption. Grade 8007 did have both the lowest water vapor permeability of 0.023 g*mm/m²*d at 23° C. and 85% relative humidity according to test method DIN 53 122 and mold shrinkage of 0.1-0.5% with testing conditions at 60° C. and a 2 mm wall thickness, using an unidentified test method.

Examples 1 and 2 differ from Comparative Example Q in that Comparative Example Q uses Topas E-140 COC elastomer, whereas Examples 1 and 2 use a styrenic block copolymer, SEBS. The inadequacy of a COC elastomer was surprising because it would be expected that a COC elastomer as an impact modifier would work well for a COC thermoplastic build material for 3D printing. The deficiency of Comparative Example Q was unacceptable warping.

A common deficiency of the Topas grades tested is the defect of warping in the object being 3D printed using those other Topas grades, even with impact modifiers present. Comparative Examples K-S all experienced unacceptable warping during 3D printing. Only Comparative Example Q used Topas 8007 grade, explained above.

Warping is a major problem in 3D printing, arising from a tendency of polymers to shrink as they cool. Integrity of proper 3D printed shape can be lost during 3D printing as a layer shrinks, which causes a distortion of surface for the next layer being printed in the z-axis. The warping can be so severe that the 3D printing head collides with the object being 3D printed. Simply put, surprisingly, Examples 1 and 2 did not warp during 3D printing. That common deficiency of warping by polymers used for 3D printing has been unpredictably overcome by the use of the Topas 8007 grade of COC.

The deficiencies of Comparative Examples A-E were lack of adhesion to the printing surface. The deficiencies of Comparative Examples F-J variously were polymer sticking to the 3D print head nozzle and curling issues. The deficiencies of Comparative Examples K-S were warping during 3D printing.

Examples 1 and 2 resulted in filament which, when 3D printed, had adhesion at the printing surface, no curling or sticking to the 3D print head nozzle, or most of all, no warping.

The invention is not limited to the above embodiments. The claims follow.

What is claimed is:

1. A method of using a build material during 3D printing comprising cyclic olefin copolymer having a heat deflection temperature HDT/B ((0.45 MPa) ISO 75, Parts 1 and 2) of 75° C. and an impact modifier, other than cyclic olefin copolymer elastomer, capable of modifying the impact properties of the cyclic olefin copolymer, wherein the impact modifier is selected from the group consisting of styrenic block copolymers, olefinic block copolymer, and combinations of them comprising the step 3D printing the build material.

2. The method of claim 1, wherein the build material further comprises optical brighteners, process aids, rheology modifiers, thermal and UV stabilizers, fluorescent and non-fluorescent dyes and pigments, radio-opaque tracers, conductive additives (both thermal and electrical), inductive heating additives, and non-silicone releases; and combinations of them.

3. The method of claim 1, wherein the styrenic block copolymer is styrene-ethylene/butylene-styrene (SEBS).

4. The method of claim 1, wherein the cyclic olefin copolymer is ethylene-norbornene copolymer which has a CAS No. of 26007-43-2.

5. The method of claim 1, wherein the ethylene-norbornene copolymer has the following structure:

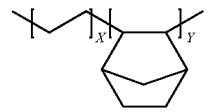

wherein X ranges from about 40 wt. % to about 20 wt. % and wherein Y ranges from about 60 wt. % to about 80 wt. %.

6. The method of claim 1, wherein the cyclic olefin copolymer has a weight average molecular weight (Mw) ranging from about 40,000 to about 130,000.

7. The method of claim 1, wherein the build material is a filament build material.

* * * * *